United States Patent
Peng et al.

(10) Patent No.: US 9,262,805 B2
(45) Date of Patent: Feb. 16, 2016

(54) METHOD AND DEVICE FOR PROCESSING IMAGE IN BAYER FORMAT

(75) Inventors: Xiaofeng Peng, Shanghai (CN); Yuchun Huang, Shanghai (CN); Fuhuei Lin, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 14/123,227

(22) PCT Filed: Aug. 7, 2012

(86) PCT No.: PCT/CN2012/079763
§ 371 (c)(1),
(2), (4) Date: Dec. 2, 2013

(87) PCT Pub. No.: WO2014/022965
PCT Pub. Date: Feb. 13, 2014

(65) Prior Publication Data
US 2015/0170337 A1    Jun. 18, 2015

(51) Int. Cl.
*G06K 9/32* (2006.01)
*G06T 3/40* (2006.01)
(Continued)

(52) U.S. Cl.
CPC ............ *G06T 3/4015* (2013.01); *G06T 3/00* (2013.01); *H04N 5/347* (2013.01); *G06T 7/408* (2013.01); *G06T 2207/10024* (2013.01); *H04N 9/64* (2013.01); *H04N 2209/046* (2013.01)

(58) Field of Classification Search
CPC ......... G06T 3/4015; G06T 3/00; G06T 7/408; G06T 2207/10024; H04N 2209/046; H04N 9/64; H04N 5/347
USPC .................................................. 382/298–300
See application file for complete search history.

(56) References Cited

U.S. PATENT DOCUMENTS 7,417,670 B1 * 8/2008 Linzer et al. ............... 348/222.1
8,666,162 B1 * 3/2014 Vakrat ........................... 382/167
(Continued)

FOREIGN PATENT DOCUMENTS

CN    101035197 A    9/2007
CN    102256047 A    11/2011

OTHER PUBLICATIONS

Daniele Menon et al: "Demosaicing With Directional Filtering and a posteriori Decision", IEEE Transactions on Image Processing, IEEE Service Center, Piscataway, NJ, US, val. 16, No. 1, Jan. 1, 2007, pp. 132-141, XP011151955, ISSN: 1 057-7149, DOI: 10.1109/TIP.2006.884928.
(Continued)

*Primary Examiner* — Kanjibhai Patel
(74) *Attorney, Agent, or Firm* — Kilpatrick Townsend & Stockton LLP

(57) ABSTRACT

A method for processing an image in Bayer format is provided. The method may include: performing a binning process in a horizontal and/or vertical direction on an image which is to be processed, so that an arrangement mode of pixels in a processed image after binning is the same with that in the image to be processed, wherein the binning process may include: determining a position of an output pixel; selecting, from the image to be processed, a plurality of pixels which have the same color component with that of the output pixel, and calculating a weighted average of the plurality of pixels, so as to obtain a pixel value of the output pixel, wherein the plurality of pixels are selected from particular positions, so that the weighted average of the plurality of pixels can be calculated. According to the present disclosure, quality of image processing can be guaranteed.

24 Claims, 6 Drawing Sheets

(51) Int. Cl.
*H04N 5/347* (2011.01)
*G06T 3/00* (2006.01)
*H04N 9/64* (2006.01)
*G06T 7/40* (2006.01)

(56) References Cited

U.S. PATENT DOCUMENTS

2008/0260291 A1* 10/2008 Alakarhu et al. ............ 382/298
2009/0046170 A1 2/2009 Linzer
2009/0167903 A1 7/2009 Sakurai et al.
2010/0039563 A1 2/2010 Lukac

OTHER PUBLICATIONS

Heiss-Czedik D et al: "Demosaicing algorithms for area- and line scan cameras in print inspection", Journal of Visual Communication and Image Representation, Academic Press, Inc, US, val. 20, No. 6, Aug. 1, 2009, pp. 389-398, XP026235801, ISSN: 1047-3203, DOI: 10.1016/J.JVCIR.2009.04.003 [retrieved on May 3, 2009].
Search Report regarding a European counterpart application (12877603.6), 8 pages.

* cited by examiner

METHOD AND DEVICE FOR PROCESSING IMAGE IN BAYER FORMAT

The present application is the national phase of International Application No. PCT/CN2012/079763, entitled "METHOD AND DEVICE FOR PROCESSING IMAGE IN BAYER FORMAT", filed on Aug. 7, 2012, the entire disclosure of which is incorporated herein by reference.

TECHNICAL FIELD

The present disclosure generally relates to image processing technology, and more particularly, to a method for processing image in Bayer format and an image processing device thereof.

BACKGROUND

Currently, in most of image sensors, like Charge-Coupled Device (CCD) or Complementary Metal Oxide Semiconductor (CMOS), information of three primary colors (Red, Green and Blue) of an image may be recorded by using a color filter array which is referred to as Bayer filter. The Bayer filler pattern is quartet-ordered with successive rows that alternate red and green filters, then green and blue filters. Therefore, images output from the CCD or CMOS image sensors usually have a Bayer format.

Typically, pixels of an image in Bayer format may have four kinds of arrangement modes. Referring to FIG. 1, take the one on the top left corner as an example, pixels output in odd-numbered scanning lines have a format of RGRG . . . , and pixels output in even-numbered scanning lines have a format of GBGB . . . . Each pixel merely needs to output one kind of color component, as people are insensitive to changes in color. Accordingly, R, G, R, G . . . information are output when sampling pixels 1, 2, 3, 4, . . . in the odd-numbered scanning lines, while G, B, G, B . . . information are output when sampling pixels 1, 2, 3, 4, . . . in the even-numbered scanning lines. In practical operation. R, G, B components of a pixel may be composed of a specific color component of this pixel and other color components of its neighbor pixels. By using the sampling method described above, sampling frequency can be reduced above 60% without obvious quality degradation.

Compared with full-color format, transmission bandwidth and storage space can be saved when images are in Bayer format. However, images in Bayer format still needs to be processed in some cases, so as to further reduce size of the images. Currently, a binning process may be used for size reduction, in which pixels in a Bayer format image may be merged together.

In some embodiments, binning is a method for reading images, where the Binning may include: calculating a mean value of multiple neighboring pixels, and outputting the mean value as a new pixel. The binning process may be performed in a horizontal direction, or in a vertical direction, or in both horizontal and vertical directions. In this way, an image size may be reduced, and the volume of image data may be decreased. In addition, because the binning process use a mean value, which is calculated based on multiple pixels, to represent a pixel value of a new pixel, image noise can be suppressed to some extent.

A conventional binning process is schematically illustrated in FIG. 2. In FIG. 2, a two-to-one binning ratio (1/2 binning process) may be taken as an example to show the binning process, where R, G and B represent red pixels, green pixels and blue pixels, respectively. Numerals on the top represent horizontal coordinates, and numerals on the left represent vertical coordinates, both of which may be used to identify pixels in the drawing. The left drawing of FIG. 2 illustrates an original Bayer format image output by an image sensor. The right drawing of FIG. 2 illustrates a Bayer format image on which a 1/2 binning process has been performed in both horizontal and vertical directions. The pixel value of the red pixel (0, 0) in the right drawing is obtained by calculating a mean value of four red pixels in the original image, namely, [R(0,0)+R(0,2)+R(2,0)+R(2,2)]/4. The correspondence between these red pixels is shown with circles and arrows. Likewise, in the left drawing of FIG. 2, for the green pixels marked with a square, the green pixels marked with a triangle, or the blue pixels not marked, mean values of these pixels equal to pixels values of pixels marked in the same way in the right drawing of FIG. 2. Thus, after a binning process is finished, the original image having a 4×4 dimension is transformed into an image having a 2×2 dimension. It should be noted that the Bayer format (arrangement mode of pixels) of the image remains unchanged despite the binning process.

Figures 3, 4:
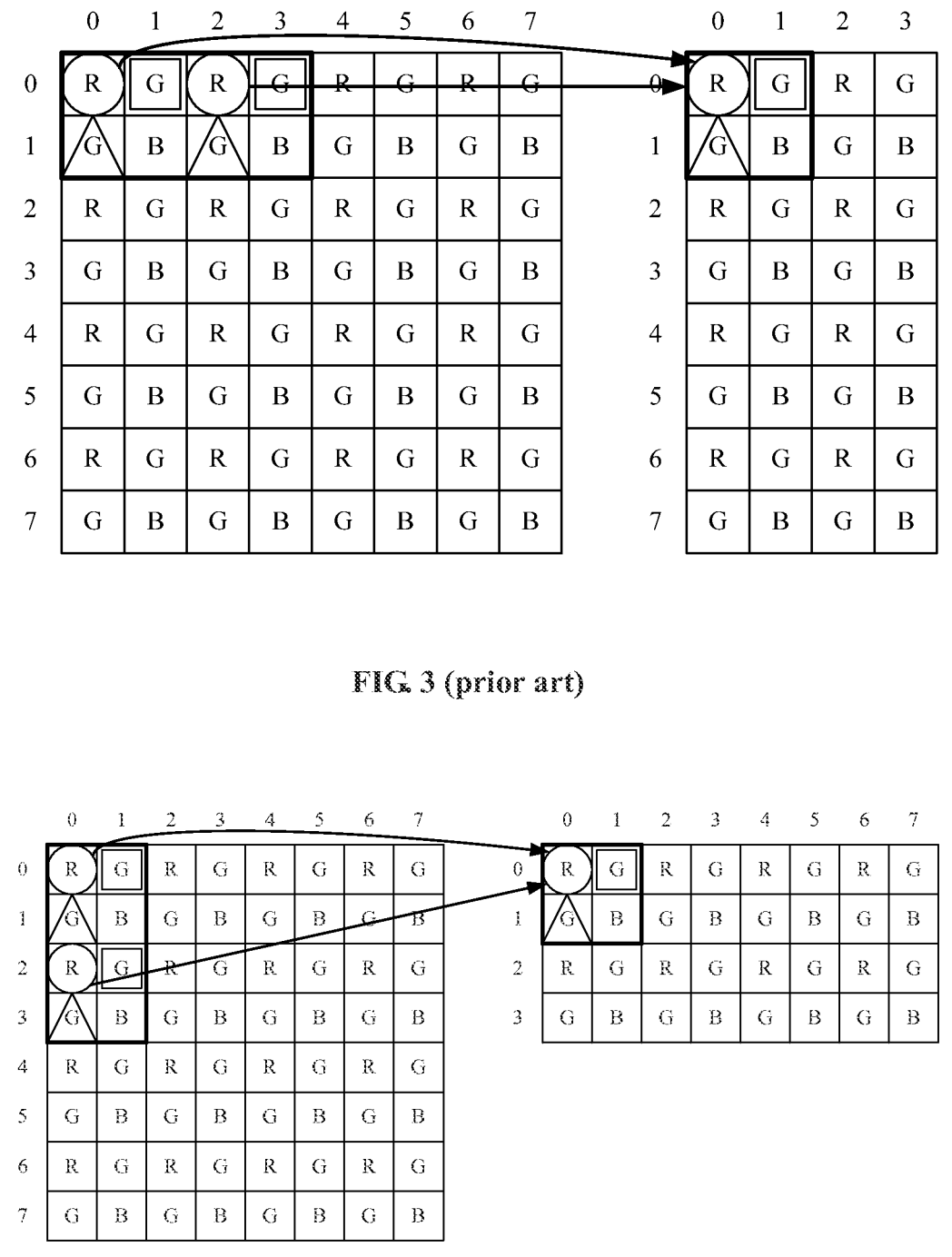

FIG. 3 schematically illustrates a conventional binning process in which a 1/2 binning is performed in a horizontal direction, where a pixel value of a pixel in the right drawing of FIG. 3 equals to a mean value of two neighboring pixels in the horizontal direction in the left original image. Referring to FIG. 3, a value of the first red pixel in the right drawing is calculated according to the formula: [R(0,0)+R(2,0)]/2. Therefore, a dimension in the horizontal direction of the image on which a binning process is performed, is a half of that of the original image, while a dimension in the vertical direction of the image on which a binning process is performed, remains unchanged.

FIG. 4 schematically illustrates a conventional binning process in which a 1/2 binning is performed in a vertical direction, where a pixel value of a pixel in the right drawing of FIG. 4 equals to a mean value of two neighboring pixels in the vertical direction in the left original image. Referring to FIG. 4, a value of the first red pixel in the right drawing is calculated according to the formula: [R(0,0)+R(0,2)]/2. Therefore, a dimension in the vertical direction of the image on which a binning process is performed, is a half of that of the original image, while a dimension in the horizontal direction of the image on which a binning process is performed, remains unchanged.

The principle of other binning processes having different binning ratios is similar to that of the 1/2 binning process. The difference is that more than two pixels may be used to calculate their mean value. Specifically, for 1/n binning process, values of n pixels in a certain direction of an original image are calculated to obtain a mean value. Thus, after a binning process is finished, an image dimension in a certain direction becomes 1/n of the original image.

However, the conventional binning process only adopts averaging method, which may cause false minutiae in the course of color interpolation and reduce image quality severely.

SUMMARY

In light of the foregoing, an image on which a conventional binning process is performed may suffer from false minutiae in the course of color interpolation, thereby significantly lowering image quality.

Embodiments of the present disclosure provide a method for processing an image in Bayer format. The method may include: performing a binning process in a horizontal and/or vertical direction on an image which is to be processed, so that an arrangement mode of pixels in a processed image after binning is the same with that in the image to be processed, wherein the binning process comprises: determining a position of an output pixel; and selecting, from the image to be processed, a plurality of pixels which have the same color component with that of the output pixel, and calculating a weighted average of the plurality of pixels, so as to obtain a pixel value of the output pixel, wherein the plurality of pixels are selected from particular positions, so that the weighted average of the plurality of pixels can be calculated.

In some embodiments, the binning process in the horizontal direction may be performed on an original image, and the binning process in the vertical direction may be performed on an image which has been processed with the binning process in the horizontal direction.

In some embodiments, the binning process in the vertical direction may be performed on an original image, and the binning process in the horizontal direction may be performed on an image which has been processed with the binning process in the vertical direction.

In some embodiments, the binning process may be performed only in the horizontal direction, and the image to be processed is an original image.

In some embodiments, the binning process may be performed only in the vertical direction, and the image to be processed is an original image.

In some embodiments, intervals between any two neighboring output pixels are identical in the image to be processed.

In some embodiments, when a 1/n binning is employed, the intervals between any two neighboring output pixels equal to n.

In some embodiments, the step of selecting, from the image to be processed, a plurality of pixels which have the same color component with that of the output pixel, may include: if a pixel in the image to be processed which has a same position with the output pixel, has a color component same with that of the output pixel, the pixel in the image to be processed which has a position same with the output pixel, together with a plurality of pixels which are neighboring to the pixel and have a color component same with the output pixel, are selected.

In some embodiments, if a 1/n binning is employed, the number of the selected neighboring pixels may be 2n−1.

In some embodiments, the step of selecting, from the image to be processed, a plurality of pixels which have the same color component with that of the output pixel, may include: if a pixel in the image to be processed which has a same position with the output pixel, has a color component different from that of the output pixel, a plurality of pixels which are neighboring to the pixel and have a color component same with the output pixel, are selected from the image to be processed.

In some embodiments, if a 1/n binning is employed, the number of the selected neighboring pixels may be n.

In some embodiments, the greater the distance between one of the plurality of pixels and the output pixel, the less the weighted value of the one of the plurality of pixels.

In one embodiment, a device for processing an image in Bayer format is provided, which may include:

a row processing unit adapted for performing a binning process on an image to be processed in a horizontal direction; and a column processing unit adapted for performing a binning process on an image to be processed in a vertical direction, wherein an arrangement mode of pixels in a processed image after binning is the same with that in the image to be processed;

wherein both the row processing unit and the column processing unit comprise a determination unit and a weighting unit, where the determination unit is adapted for determining a position of an output pixel; and the weighting unit is adapted for selecting, from the image to be processed, a plurality of pixels which have the same color component with that of the output pixel, and calculating a weighted average of the plurality of pixels, so as to obtain a pixel value of the output pixel, wherein the plurality of pixels are selected from particular positions, so that the weighted average of the plurality of pixels can be calculated.

Compared with the prior art, the binning process according to the present disclosure take into account position relationship of an output pixel in an image to be processed. In turn, a plurality of pixels may be selected from the image to be processed based on the position relationship. And a weight average of the plurality of pixels is calculated to obtain a value of the output pixel. Therefore, according to the present disclosure, image size, volume of image data and image noise can be reduced, just as does the conventional prior. In addition, quality of image processing can be guaranteed in the event of color interpolation without introduction of false minutiae.

BRIEF DESCRIPTION OF THE DRAWINGS

FIG. 3 schematically illustrates a conventional binning process in which a 1/2 binning process is performed in a horizontal direction;

FIG. 4 schematically illustrates a conventional binning process in which a 1/2 binning process is performed in a vertical direction;

DETAILED DESCRIPTION

It is found that pixels are averaged in the conventional binning process, which fails to take into account spatial position relations of pixels after a binning process is performed. Hereunder, referring to FIG. 5, a 1/2 binning process in a horizontal direction may be taken as an example for interpretation.

Figures 1, 2:
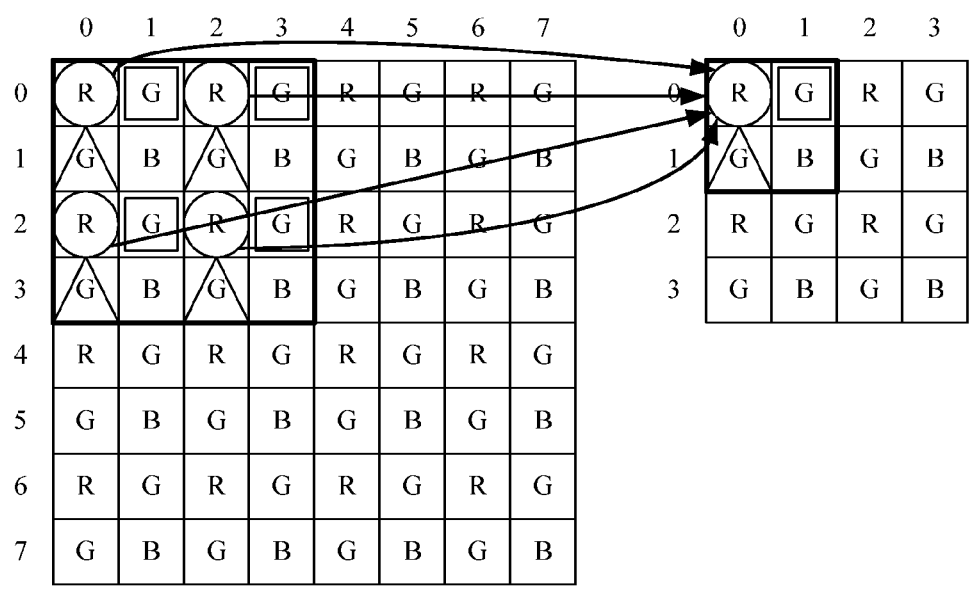
FIG. 1 schematically illustrates four kinds of arrangement modes of pixels in a Bayer format image.
FIG. 2 schematically illustrates a conventional binning process in which a 1/2 binning process is performed in both horizontal and vertical directions.
Figure 5:
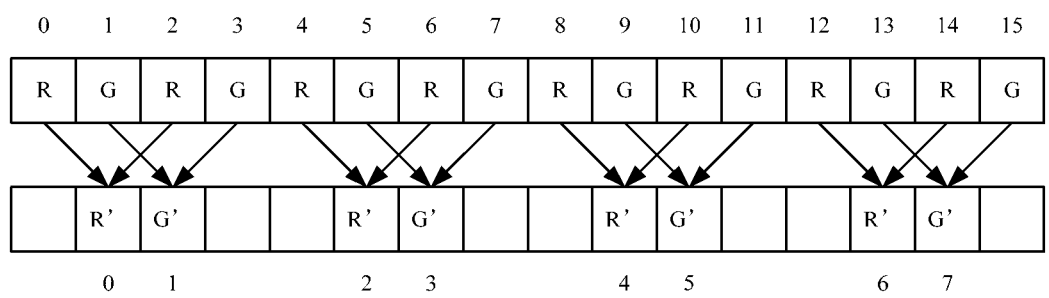
FIG. 5 schematically illustrates a row of pixels in a conventional 1/2 binning process which is performed in a horizontal direction.

Because the 1/2 binning process is performed merely in the horizontal direction, only one row of pixels in the horizontal direction is shown in FIG. 5. Referring to FIG. 5, the first row of pixels are original before binning, and numerals on the top of these pixels represent corresponding positions of these pixels in an original image. The second row of pixels have been processed by binning, and numerals beneath these pixels represent corresponding positions of these pixels in an image after binning. Arrows in FIG. 5 represent relationship between pixels before and after binning. During the binning process, each pixel for calculating a mean value has a same weight. For example, the value of the first binned pixel R'(0) equals to [R(0)+R(2)]/2. Because R(0) has a weighted value identical to that of R(2), the pixel R'(0) should be located between the pixels R(0) and R(2), and equidistant from the two pixels R(0) and R(2). That is, the pixel R'(0) should be located at coordinate (1) of the original image. Likewise, spatial positions of other pixels in the first row may be obtained after binning. For the second row of pixels in FIG. 5, distances between pixels after binning are not equal. For example, the distance between the green pixel G'(1) and the red pixel R'(0) on the left side of G'(1) is less than that between the green pixel G'(1) and the red pixel R'(2) on the right side of G'(1). The same situation may occur when a binning process is performed in the vertical direction.

Because each pixel in a Bayer format image only has one color component, color interpolation may be performed on the Bayer format image to obtain a multicolor image. The color interpolation is to obtain the other two color components that a pixel loses by employing neighboring pixels of the pixel. Distances between pixels should be equidistant in color interpolation, so that a proper weight can be assigned to neighboring pixels to perform color interpolation. However, pixels of the image after the conventional binning process are distributed with unequal separation. Therefore, it is difficult to assign a proper weight to the neighboring pixels, which may cause false minutiae and reduce image quality severely.

In light of the above, embodiments of the disclosure provide a method for processing an image in Bayer format and an image processing device thereof. According to the embodiments of the present disclosure, image size, volume of image data and image noise can be reduced, and image quality after color interpolation can be guaranteed as well.

In some embodiments, a method for processing an image in Bayer format may include: performing a binning process on an image which is to be processed, so that an arrangement mode of pixels in an image on which the binning process is finished is the same with that in the image to be processed, wherein the binning process may include:

determining a position of an output pixel; selecting a plurality of pixels which have the same color component with that of the output pixel; and calculating a weighted average of the plurality of pixels, so as to obtain a pixel value of the output pixel, wherein the plurality of pixels are selected from particular positions, so that the weighted average of the plurality of pixels can be calculated.

In some embodiments, the binning process may be performed on the image to be processed only in a horizontal direction, wherein the image to be processed is an original image, namely, an image output by an image sensor.

In some embodiments, the binning process may be performed on the image to be processed only in a vertical direction, wherein the image to be processed is an original image.

In some embodiments, the binning process may be performed on the image to be processed firstly in a horizontal direction, then in a vertical direction, wherein when the binning process is performed in the horizontal direction, the image to be processed is an original image, while when the binning process is performed in the vertical direction, the image to be processed is an image on which the binning process in the horizontal direction has been finished.

In some embodiments, the binning process may be performed on the image to be processed firstly in a vertical direction, then in a horizontal direction, wherein when the binning process is performed in the vertical direction, the image to be processed is an original image, while when the binning process is performed in the horizontal direction, the image to be processed is an image on which the binning process in the vertical direction has been finished.

In order to clarify the objects, characteristics and advantages of the disclosure, embodiments of the present disclosure will be described in detail in conjunction with the accompanying drawings.

Figure 6:
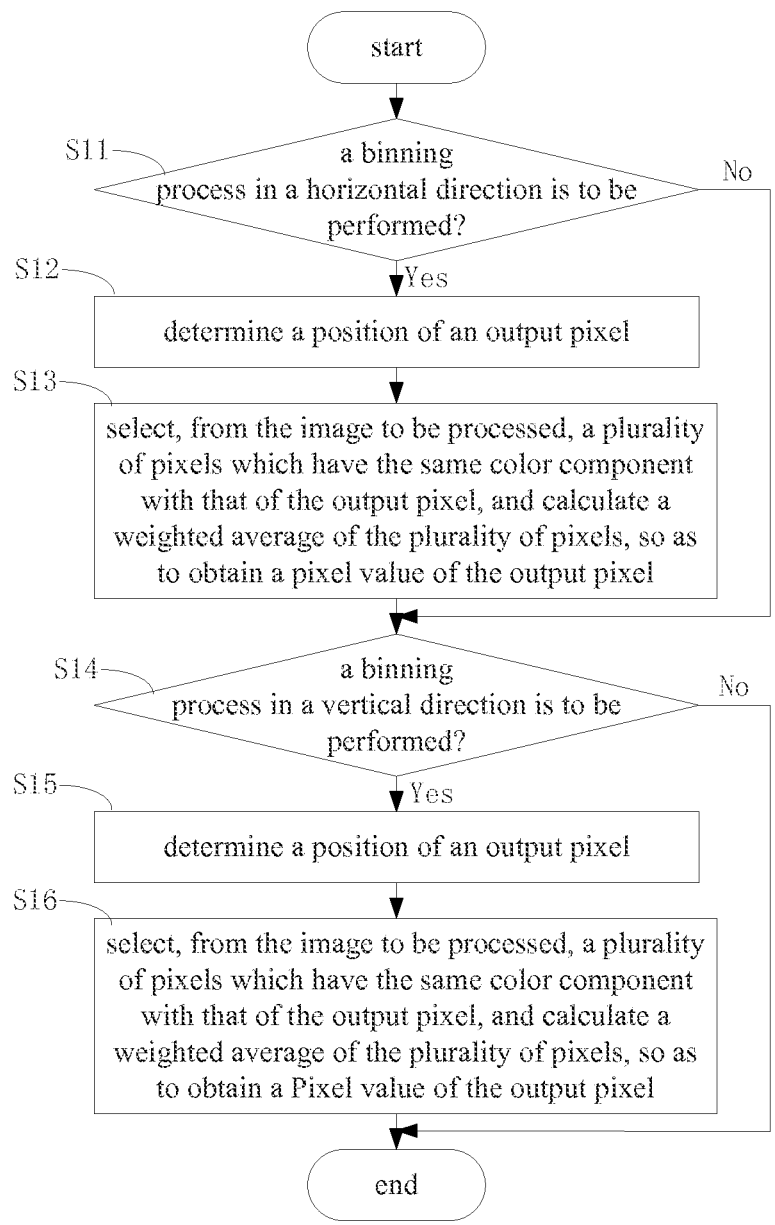
FIG. 6 schematically illustrates a flow chart of a method for processing an image in Bayer format according to one embodiment of the present disclosure.

Referring to FIG. 6, the image processing method may include the steps of S11 to S16. In S11, determine whether a binning process in a horizontal direction is to be performed on an image to be processed. If the determination result in S11 is YES, the method goes to S12. In S12, determine a position of an output pixel. In the embodiment, a position of an output pixel is a position where the output pixel locates on the image to be processed. If the determination result in S11 is NO, the method goes to S14. In S14, determine whether a binning process in a vertical direction is to be performed on the image to be processed, wherein an arrangement mode of pixels in an image which has been processed in the above steps is the same with that in the image to be processed. In some embodiments, whether the binning process in a vertical direction is to be performed may be firstly determined, then the binning process in a horizontal direction may be determined.

The binning process in the horizontal direction is independent from the binning process in the vertical direction. In some embodiments, a binning process in a horizontal direction may be performed firstly. In some embodiments, a binning process in a vertical direction may be performed firstly. In some embodiments, a binning process in a horizontal or vertical direction may be performed merely. In this embodiment, a binning process in a horizontal direction is performed firstly, and a binning process in a vertical direction is performed subsequently. In this embodiment, a 1/2 binning process is taken as an example for interpretation.

If the determination result in S11 is YES, the method goes to S12, in which a position of an output pixel is determined. Because the binning process in the horizontal direction is performed firstly in this embodiment, a position of an output pixel in S12 is determined according to positions of pixels in the original image, while a position of an output pixel in S15 is determined according to positions of pixels in an image on which the binning process in the horizontal direction has been performed. In other words, the binning process in the vertical direction in S15 is performed on the basis of the steps of S11 to S14 in which the binning process in a horizontal direction is finished.

Figure 7:
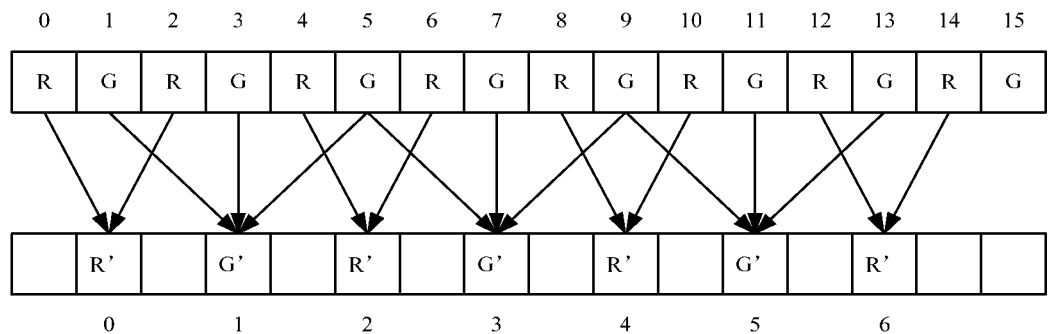
FIG. 7 schematically illustrates a row of pixels before binning and after binning in a horizontal direction in a method for processing an image in Bayer format according to one embodiment of the present disclosure.

An arrangement mode of output pixels is the same with that in the image to be processed. And the intervals between neighboring output pixels are identical in the image to be processed. In this embodiment, the interval equals to 2. Referring to FIG. 7, a 1/2 binning process in a horizontal direction is taken as an example. In FIG. 7, a row of pixels in a Bayer image to be processed before binning and after binning in a horizontal direction are presented. The arrangement mode of output pixels is RGRG . . . , which is the same with that of the image to be processed. To achieve the identical arrangement modes, the first pixel in each row of the image on which a binning process has been performed may have the same color component with the first pixel in a corresponding row of the image to be processed. The interval between any two pixels equals to 2. For example, the output pixel R'(0) has a position corresponds to a position of the pixel G(1) in the image to be processed; the output pixel G'(1) has a position corresponds to a position of the pixel G(3) in the image to be processed; and the interval between the output pixels R'(0) and G'(1) equals to 2. Correspondingly, if a 1/n binning ratio (1/n binning process) is employed, an interval between any neighboring output pixels equals to n.

In S13, select, from the image to be processed, a plurality of pixels which have the same color component with that of the output pixel, and calculate a weighted average of the plurality of pixels, so as to obtain a pixel value of the output pixel, wherein the plurality of pixels are selected from particular positions, so that the weighted average of the plurality of pixels can be calculated. The weighted value decreases as the distance between one of the selected plurality of pixels and the output pixel increases.

According to actual applications, there may be two situations as follows:

1, If a pixel in an image to be processed has a color component same with that of an output pixel which has a position same with the pixel in the image to be processed, the pixel in the image to be processed which has a position same with the output pixel, together with a plurality of pixels neighboring to the pixel which have the same color component with the pixel, may be selected. Referring to FIG. 7, the pixel G having a coordinate 7 in the image to be processed has a same position and a same color component with the pixel G' having a coordinate 3. Then, the pixel G(7) which has a same position with the pixel G'(3), together with pixels G(5) and G(9) which are neighboring to the pixel G(7) and have the same color component with the pixel G(7), are selected from the image to be processed. As a 1/2 binning process is employed in this embodiment, only a pair of directly neighboring pixels are selected, and it is accurate to employ the pixel G(7) together with the pixels G(5) and G(9) to calculate the pixel value of the pixel G'(3). Therefore, no more pixels are selected. It should be noted that the number of the selected neighboring pixels may not be limited to 2. In some embodiments, if a 1/n binning process is employed, the number of the selected neighboring pixels may be 2n−1. In some embodiments, more than 2n−1 neighboring pixels may be selected.

As for weighted values, as the distance between the pixels G(5) or G(9) and the pixel G'(3) is greater than that between the pixel G(7) and the pixel G'(3), the weighted values of the pixels G(5) and G(9) are set to 1, while the weighted value of the pixel G(7) is set to 2. The weighted values are not limited to a fixed value, as long as they meet this requirement: the greater the distance between a pixel and its corresponding output pixel, the smaller the weighted value of the pixel. In some embodiments, weighted values of two pixels which have positions symmetrical relative to their corresponding output pixel, may be the same. The pixel value of the pixel G'(3) may be obtained by G'(3)=[G(5)+2*G(7)+G(9)]/4, where weighted values of the pixels G(5) and G(9) are the same. The mean value of the pixels G(5) and G(9) is in the middle of them. This position of the mean value coincides with that of the pixel G(7), meanwhile, it also corresponds to that of the output pixel G'(3). Because position of the pixel G(7) coincides with that of the output pixel G'(3) in the original image, the pixel G(7) is deemed to be the pixel nearest to the output pixel G'(3). Therefore, when the pixel G(7) is invoked for calculation, its weighted value is greater than that of the pixels G(5) and G(9). In some embodiments, weighted values may vary with the selection of the plurality of pixels from the image to be processed. For example, referring to FIG. 7, if pixels G(3) and G(5) are selected, both of them, together with the pixel G(7) which has a same position with the output pixel G'(3), are used to calculate a pixel value of the output pixel G'(3) according to the formula: G'(3)=[G(3)+2*G(5)+3*G(7)]/6, where weighted values of the pixels G(3) and G(5) decrease as their distances to the pixel G(7) increases. In this embodiment, weighted values of the pixels G(3) and G(5) are set to 1 and 2, respectively. Because positions of the pixel G(7) and the output pixel G'(3) are coincident, its weighted value is set to 3. The weighted values may not limited to a fixed value, only if they meet this requirement: the greater the distance between a pixel and its corresponding output pixel, the smaller the weighted value of the pixel. Similarly, if pixels G(3) and G(9) are selected, both of them, together with the pixel G(7) which has a same position with the output pixel G'(3), are used to calculate a pixel value of the output pixel G'(3) according to the formula: G'(3)=[G(3)+2*G(9)+3*G(7)]/6. In other words, it is feasible to select a plurality of pixels as long as positions of the plurality of pixels can be used to obtain a corresponding output pixel by weighted average method.

2, If a pixel in an image to be processed has a color component different from that of an output pixel which has a position same with the pixel, a plurality of pixels neighboring to the pixel which have a color component same with the output pixel may be selected from the image to be processed. Referring to FIG. 7, the pixel G which has a coordinate 5 in the image to be processed, has a color component different from the output pixel R' which has a coordinate 2. Then, pixels R(4) and R(6) which are neighboring to the pixel G(5) and have a same color component with the output pixel R'(2), are selected from the image to be processed. In this embodiment, the selected pixels R(4) and R(6) are directly neighboring to the pixel G(5). As a 1/2 binning process is employed in this embodiment, it is accurate to employ the pixels R(4) and R(6) are adequate to calculate the pixel value of the pixel R'(2). Therefore, no more pixels are selected. In some embodiments, if a 1/n binning process is employed, the number of the selected neighboring pixels may be n. In some embodiments, more than n neighboring pixels may be selected.

As for weighted values, as the distance between the pixels R(4) or R(6) and the output pixel R'(2) are the same, the weighted values of the pixels R(4) or R(6) are identical. The pixel value of the output pixel R'(2) may be obtained by R'(2)=[R(4)+R(6)]/2. The weighted values may vary with the selection of the plurality of pixels from the image to be processed, which may refer to the above description, and will not described in detail herein.

According to the steps of S12 and S13, pixel values of all output pixels in the row may be calculated successively. It should be noted that, when a binning process in a horizontal direction is performed, pixels in the last few columns may be insufficient for weighted average calculation. In this case, the last few columns may be duplicated, or mirrored to be introduced into weighted average calculation.

In S14, determine whether a binning process in a vertical direction is to be performed on an image to be processed. If the determination result in S14 is YES, the method goes to S15. In S15, determine an output pixel's position in the image to be processed. If the determination result in S14 is NO, the method is finished.

Figure 8:
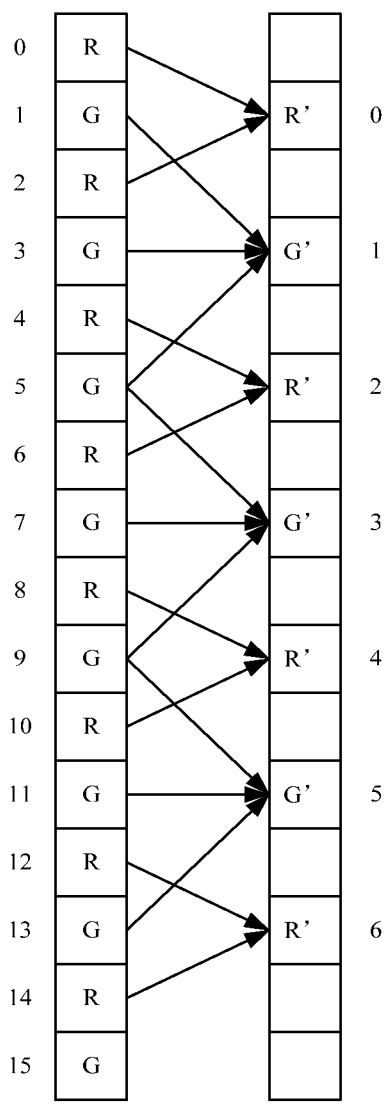
FIG. 8 schematically illustrates a column of pixels before binning and after binning in a vertical direction in a method for processing an image in Bayer format according to one embodiment of the present disclosure.

The step S15 may be described with reference to the step of S12 in conjunction with FIG. 8. The difference is that the image to be processed in the step S15 is an image on which a binning process in a horizontal direction has been performed.

In other words, the binning process in a vertical direction in S15 is performed on the basis of the steps of S11 to S14 in which the binning process in a horizontal direction is finished. The step S12 is performed to determine an output pixel's position in a horizontal direction in an image to be processed. The step S15 is performed to determine an output pixel's position in a vertical direction in an image to be processed.

In S16, select a plurality of pixels which have the same color component with that of the output pixel, and calculate a weighted average of the plurality of pixels, so as to obtain a pixel value of the output pixel, wherein the plurality of pixels are selected from particular positions, so that the weighted average of the plurality of pixels can be calculated. The greater the distance between one of the selected plurality of pixels and the output pixel, the less the weighted value. In this step, a plurality of pixels in a column may be selected for calculating weighted average. The selection of pixels in a column, and the set of weighted values may refer to the step S13 described above, in conjunction with FIG. 8.

Figure 9:
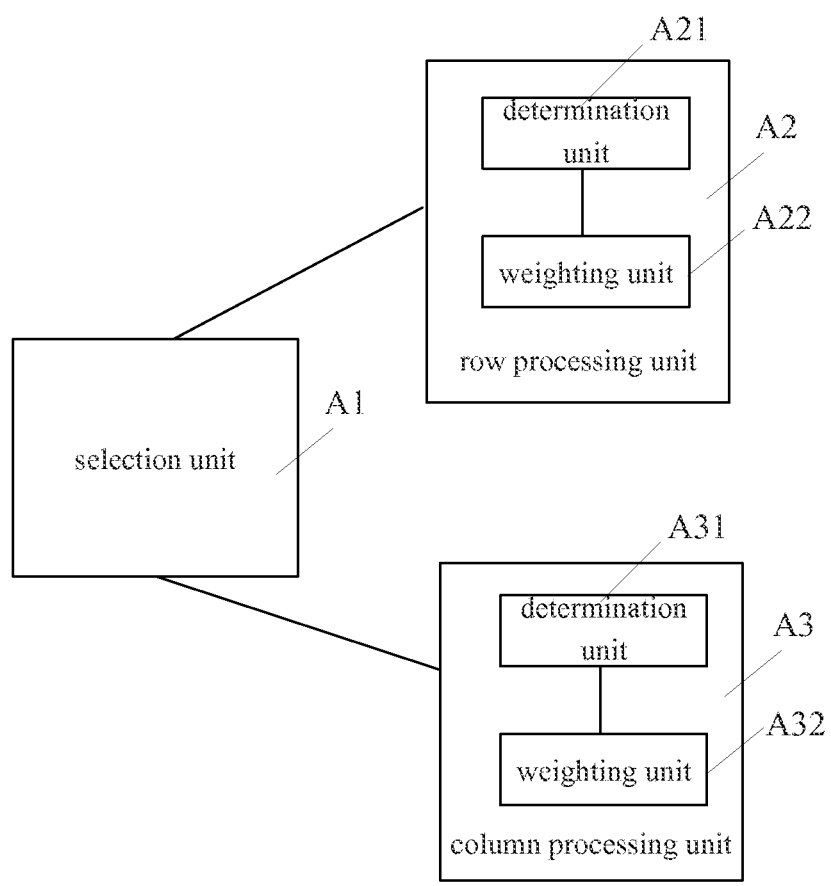
FIG. 9 schematically illustrates a device for processing an image in Bayer format according to one embodiment of the present disclosure.

Correspondingly, a device for processing an image in Bayer format is schematically illustrated in FIG. 9, which may include a selection unit A1, a row processing unit A2, and a column processing unit A3.

The selection unit A1 is adapted for determining whether a binning process in a vertical or horizontal direction is to be performed on an image to be processed. The row processing unit A2 is adapted for performing a binning process on an image to be processed in a horizontal direction. The column processing unit A3 is adapted for performing a binning process on an image to be processed in a vertical direction.

The row processing unit A2 may include a determination unit A21 and a weighting unit A22 connected to the determination unit A21. The determination unit A21 is adapted for determining an output pixel's position in a horizontal direction in an image to be processed. The output pixel is a pixel in an image on which a binning process has been performed. And an arrangement mode of pixels in the image on which a binning process has been performed is the same with that in the image to be processed. The weighting unit A22 is adapted for selecting, from the image to be processed in a horizontal direction, a plurality of pixels which have the same color component with that of the output pixel, and calculating a weighted average of the plurality of pixels, so as to obtain a pixel value of the output pixel in a horizontal direction, wherein the plurality of pixels are selected from particular positions, so that the weighted average of the plurality of pixels can be calculated.

The vertical processing unit A3 may include a determination unit A31 and a weighting unit A32 connected to the determination unit A31. The determination unit A31 is adapted for determining an output pixel's position in a vertical direction in an image to be processed. The output pixel is a pixel in an image on which a binning process has been performed. And an arrangement mode of pixels in the image on which a binning process has been performed is the same with that in the image to be processed. The weighting unit A32 is adapted for selecting, from the image to be processed in a vertical direction, a plurality of pixels which have the same color component with that of the output pixel, and calculating a weighted average of the plurality of pixels, so as to obtain a pixel value of the output pixel in a vertical direction, wherein the plurality of pixels are selected from particular positions, so that the weighted average of the plurality of pixels can be calculated.

In some embodiments, data of a Bayer format image may be obtained by an acquiring unit (not shown). The data of the image is transmitted to the selection unit A1 for determination. If a binning process in a horizontal direction needs to be performed, the row processing unit A2 is selected. If a binning process in a vertical direction needs to be performed, the column processing unit A3 is selected. The detailed image processing processes may refer to the method for processing a Bayer format image described above, and will not described in detail herein.

In some embodiments, a device for processing an image in Bayer format may merely include a row processing unit, which is adapted for performing a binning process in a horizontal direction on an image to be processed. Alternatively, a device for processing an image in Bayer format may merely include a column processing unit, which is adapted for performing a binning process in a vertical direction on an image to be processed.

In conclusion, according to a method and device for processing an image in Bayer format provided in embodiments of the present disclosure, by calculating a weighted average of multiple pixels, image size, volume of image data and image noise can be reduced. And, the Bayer format of an image to be processed remains unchanged after a binning process is finished. Further, quality of image processing can be guaranteed after color interpolation without introduction of false minutiae. In addition, the method provided in embodiments of the present disclosure is simple and normalized, which facilitates implementation of using a hardware system in high-performance applications.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

We claim:

1. A method for processing an image in Bayer format using an image processing device, the method comprising:
    performing a binning process in a horizontal and/or vertical direction on an image which is to be processed, so that an arrangement mode of pixels in a processed image after binning is the same with that in the image to be processed, wherein the binning process comprises:
    determining a position of an output pixel;
    determining whether a pixel in the image to be processed, which has the same position as the output pixel, has a color component that is the same or different than that of the output pixel;
    selecting, from the image to be processed, a plurality of pixels which have the same color component with that of the output pixel based at least in part on whether the color component of the pixel is the same or different than that of the output pixel; and
    calculating a weighted average of the plurality of pixels, so as to obtain a pixel value of the output pixel, wherein the plurality of pixels are selected from particular positions, so that the weighted average of the plurality of pixels can be calculated for processing the image in Bayer format.

2. The method according to claim 1, wherein the binning process in the horizontal direction is performed on an original image, and the binning process in the vertical direction is performed on an image which has been processed with the binning process in the horizontal direction.

3. The method according to claim 1, wherein the binning process in the vertical direction is performed on an original image, and the binning process in the horizontal direction is performed on an image which has been processed with the binning process in the vertical direction.

4. The method according to claim 1, wherein the binning process is performed only in the horizontal direction, and the image to be processed is an original image.

5. The method according to claim 1, wherein the binning process is performed only in the vertical direction, and the image to be processed is an original image.

6. The method according to claim 1, wherein intervals between any two neighboring output pixels are identical in the image to be processed.

7. The method according to claim 6, wherein when a 1/n binning is employed, the intervals between any two neighboring output pixels equal to n.

8. The method according to claim 1, wherein the step of selecting, from the image to be processed, a plurality of pixels which have the same color component with that of the output pixel, comprises:
if a pixel in the image to be processed which has a same position with the output pixel, has a color component same with that of the output pixel, the pixel in the image to be processed which has a position same with the output pixel, together with a plurality of pixels which are neighboring to the pixel and have a color component same with the output pixel, are selected.

9. The method according to claim 8, wherein if a 1/n binning is employed, the number of the selected neighboring pixels is 2n−1.

10. The method according to claim 1, wherein the step of selecting, from the image to be processed, a plurality of pixels which have the same color component with that of the output pixel, comprises:
if a pixel in the image to be processed which has a same position with the output pixel, has a color component different from that of the output pixel, a plurality of pixels which are neighboring to the pixel and have a color component same with the output pixel, are selected from the image to be processed.

11. The method according to claim 10, wherein if a 1/n binning is employed, the number of the selected neighboring pixels is n.

12. The method according to claim 1, wherein the greater the distance between one of the plurality of pixels and the output pixel, the less the weighted value of the one of the plurality of pixels.

13. A device for processing an image in Bayer format, comprising:
a row processing unit adapted for performing a binning process on an image to be processed in a horizontal direction; and
a column processing unit adapted for performing a binning process on an image to be processed in a vertical direction, wherein an arrangement mode of pixels in a processed image after binning is the same with that in the image to be processed;
wherein both the row processing unit and the column processing unit comprise a determination unit and a weighting unit, where
the determination unit is adapted for determining a position of an output pixel and determining whether a pixel in the image to be processed, which has the same position as the output pixel, has a color component that is the same or different than that of the output pixel; and
the weighting unit is adapted for selecting, from the image to be processed, a plurality of pixels which have the same color component with that of the output pixel based at least in part on whether the color component of the pixel is the same or different than that of the output pixel, and calculating a weighted average of the plurality of pixels, so as to obtain a pixel value of the output pixel, wherein the plurality of pixels are selected from particular positions, so that the weighted average of the plurality of pixels can be calculated for processing the image in Bayer format.

14. The device according to claim 13, wherein the binning process in the horizontal direction is performed on an original image, and the binning process in the vertical direction is performed on an image which has been processed with the binning process in the horizontal direction.

15. The device according to claim 13, wherein the binning process in the vertical direction is performed on an original image, and the binning process in the horizontal direction is performed on an image which has been processed with the binning process in the vertical direction.

16. The device according to claim 13, wherein the binning process is performed only in a horizontal direction, and the image to be processed is an original image.

17. The device according to claim 13, wherein the binning process is performed only in a vertical direction, and the image to be processed is an original image.

18. The device according to claim 13, wherein intervals between any two neighboring output pixels are identical in the image to be processed.

19. The device according to claim 18, wherein when a 1/n binning is employed, the intervals between any two neighboring output pixels equal to n.

20. The device according to claim 13, wherein the weighting unit selecting, from the image to be processed, a plurality of pixels which have the same color component with that of the output pixel, comprises:
if a pixel in the image to be processed which has a same position with the output pixel, has a color component same with that of the output pixel, the pixel in the image to be processed which has a position same with the output pixel, together with a plurality of pixels which are neighboring to the pixel and have a color component same with the output pixel, are selected.

21. The device according to claim 20, wherein if a 1/n binning is employed, the number of the selected neighboring pixels is 2n−1.

22. The device according to claim 13, wherein the weighting unit selecting, from the image to be processed, a plurality of pixels which have the same color component with that of the output pixel, comprises:
if a pixel in the image to be processed which has a same position with the output pixel, has a color component different from that of the output pixel, a plurality of pixels which are neighboring to the pixel and have a color component same with the output pixel, are selected from the image to be processed.

23. The device according to claim 22, wherein if a 1/n binning is employed, the number of the selected neighboring pixels is n.

24. The device according to claim 13, wherein the greater the distance between one of the selected plurality of pixels and the output pixel, the less the weighted value of the one of the plurality of pixels.

* * * * *